United States Patent
Jiang et al.

(10) Patent No.: US 12,426,082 B2
(45) Date of Patent: Sep. 23, 2025

(54) RANDOM ACCESS CONFIGURATION METHOD, SIGNAL TRANSMISSION METHOD, APPARATUSES THEREOF AND SYSTEM

(71) Applicant: FUJITSU LIMITED, Kawasaki (JP)

(72) Inventors: Qinyan Jiang, Beijing (CN); Lei Zhang, Beijing (CN); Xin Wang, Beijing (CN); Guoyu Zhang, Beijing (CN); Meiyi Jia, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 950 days.

(21) Appl. No.: 17/221,668

(22) Filed: Apr. 2, 2021

(65) Prior Publication Data
US 2021/0227578 A1    Jul. 22, 2021

Related U.S. Application Data

(63) Continuation of application No. PCT/CN2018/113846, filed on Nov. 2, 2018.

(51) Int. Cl.
*H04W 74/00* (2009.01)
*H04L 1/00* (2006.01)
(Continued)

(52) U.S. Cl.
CPC ......... *H04W 74/002* (2013.01); *H04L 1/0068* (2013.01); *H04W 72/0446* (2013.01); *H04W 74/0833* (2013.01)

(58) Field of Classification Search
CPC ........... H04W 74/008; H04W 72/0446; H04W 74/0833; H04L 1/0068
See application file for complete search history.

(56) References Cited

U.S. PATENT DOCUMENTS 10,856,320 B2 *  12/2020  Jung ...................... H04L 5/0042
10,887,903 B2 *  1/2021   Babaei ............... H04W 72/1273
(Continued)

FOREIGN PATENT DOCUMENTS

CN    106941730 A    7/2017
CN    107371242 A    11/2017
(Continued)

OTHER PUBLICATIONS

Extended European search report with the supplementary European search report and the European search opinion issued by the European Patent Office for corresponding European Patent Application No. 18938532.1-1215, mailed on Nov. 9, 2021.
(Continued)

*Primary Examiner* — Bailor C Hsu
(74) *Attorney, Agent, or Firm* — Myers Wolin, LLC

(57) ABSTRACT

A random access configuration method, a signal transmission method, apparatuses thereof and a system. The random access configuration method includes: a network device transmits first indication information, the first indication information including at least one of the following information: random access channel configuration index (first index); time gap between random access resources which are neighboring to each other in time domain; invalid random access resource(s); at least two time-domain starting positions of a random access resource; time-domain ending position of a random access resource; number of channel access attempts; and type of channel access. Hence, sufficient time gaps or more opportunities between neighboring random access resources may be guaranteed by the random access configuration method for performing channel detection, and the terminal equipment may perform channel detection accordingly and transmit msg.1 on a random access resource.

16 Claims, 10 Drawing Sheets

(51) Int. Cl.
  *H04W 72/04* (2023.01)
  *H04W 72/0446* (2023.01)
  *H04W 74/08* (2024.01)
  *H04W 74/0833* (2024.01)

(56) References Cited

U.S. PATENT DOCUMENTS

| | | | | |
|---|---|---|---|---|
| 11,882,592 | B2* | 1/2024 | Agiwal | H04W 74/002 |
| 12,167,474 | B2* | 12/2024 | Xiong | H04W 72/0446 |
| 12,317,326 | B2* | 5/2025 | Vangala | H04W 74/0833 |
| 2014/0112259 | A1* | 4/2014 | Bagheri | H04W 72/51 370/329 |
| 2017/0150523 | A1 | 5/2017 | Patel et al. | |
| 2017/0231011 | A1* | 8/2017 | Park | H04W 72/0446 |
| 2017/0295596 | A1* | 10/2017 | Chen | H04W 74/002 |
| 2018/0146476 | A1 | 5/2018 | Kim et al. | |
| 2018/0279186 | A1* | 9/2018 | Park | H04W 36/30 |
| 2018/0316474 | A1 | 11/2018 | Mukherjee et al. | |
| 2019/0069322 | A1* | 2/2019 | Davydov | H04L 5/0091 |
| 2019/0082472 | A1 | 3/2019 | Zhang et al. | |
| 2019/0104544 | A1* | 4/2019 | Axnäs et al. | H04W 74/085 |
| 2019/0159261 | A1* | 5/2019 | Jung | H04W 72/542 |
| 2019/0223214 | A1 | 7/2019 | Jiang et al. | |
| 2019/0246425 | A1* | 8/2019 | Zhang | H04W 74/0833 |
| 2019/0254077 | A1 | 8/2019 | Sahlin et al. | |
| 2019/0313447 | A1* | 10/2019 | Islam | H04W 74/006 |
| 2019/0349837 | A1* | 11/2019 | Shih | H04W 48/08 |
| 2019/0350006 | A1 | 11/2019 | Qian et al. | |
| 2020/0077446 | A1* | 3/2020 | Agiwal | H04W 74/0833 |
| 2020/0396744 | A1* | 12/2020 | Xiong | H04B 7/088 |
| 2020/0404711 | A1 | 12/2020 | Zhao et al. | |
| 2022/0046714 | A1* | 2/2022 | Zhou | H04L 25/0224 |
| 2022/0338264 | A1* | 10/2022 | Ko | H04W 74/006 |

FOREIGN PATENT DOCUMENTS

| | | |
|---|---|---|
| CN | 107517501 A | 12/2017 |
| CN | 108271275 A | 7/2018 |
| CN | 108289338 | 7/2018 |
| CN | 108353427 A | 7/2018 |
| CN | 108633056 A | 10/2018 |
| EP | 3 750 367 | 12/2020 |
| JP | 2019-537891 A | 12/2019 |
| JP | 2020-502918 A | 1/2020 |
| WO | 2017/078602 A1 | 5/2017 |
| WO | 2018/083662 A1 | 5/2018 |
| WO | 2018/112918 A1 | 6/2018 |
| WO | 2019/157086 A1 | 8/2019 |

OTHER PUBLICATIONS

NTT Docomo, Inc., "Remaining details on PRACH formats", Agenda Item: 7.1.4.1, 3GPP TSG-RAN WG1 Meeting #91, R1-1720794, Reno, USA, Nov. 27-Dec. 1, 2017.
Interdigital Inc., "On Initial Access and Mobility for NR-U", Agenda Item: 7.2.2.4.2, 3GPP TSG-RAN WG1 Meeting #94, R1-1809090, Gothenburg, Sweden, Aug. 20-24, 2018.
Zte et al., "PRACH Resource Configuration", Agenda Item: 7.1.4.1, 3GPP TSG-RAN WG1 Meeting #91, R1-1719345, Reno, USA, Nov. 27-Dec. 1, 2017.
LG Electronics, "Initial access and mobility for NR unlicensed operation", Agenda Item: 7.2.2.4.2, 3GPP TSG-RAN WG1 Meeting #94bis, R1-1810270, Chengdu, China, Oct. 8-12, 2018.
Second Notification of Office Action and Search Report issued by the China National Intellectual Property Administration for corresponding Chinese Patent Application No. 201880097871.6, mailed on Oct. 14, 2023, with an English translation.
Notice of Reasons for Refusal issued by the Japan Patent Office for corresponding Japanese Patent Application No. 2021-518155, mailed on May 24, 2022, with an English translation.
International Search Report and Written Opinion of the International Searching Authority issued by the National Intellectual Property Administration of the P.R. China, for corresponding International Patent Application No. PCT/CN2018/113846, mailed on Jun. 5, 2019, with an English translation.
CMCC, "Discussion on RACH configuration", Agenda Item: 7.1.4.1, 3GPP TSG-RAN WG1 Meeting #91, R1-1720584, Reno, USA, Nov. 27-Dec. 1, 2017.
Ericsson, "Remaining details on NR-RACH formats and configurations", Agenda Item: 7.1.4.1, 3GPP TSG-RAN WG1 Meeting #91, R1-1720940, Reno, USA, Nov. 27-Dec. 1, 2017.
Communication pursuant to Article 94(3) EPC issued by the European Patent Office for corresponding European Patent Application No. 18 938 532.1-1215, mailed on Aug. 9, 2023.
Convida Wireless, "Summary of Remaining details on PRACH formats", Agenda Item: 7.1.1.4.1, 3GPP TSG-RAN WG1 Meeting #93, R1-1807830, Busan, Korea, May 21-25, 2018.
Samsung, "Initial Access and Mobility Procedure for NR-U", Agenda Item: 7.2.2.4.2, 3GPP TSG-RAN WG1 Meeting #94bis, R1-1810861, Chengdu, China, Oct. 8-12, 2018.
Notice of Termination of Reconsideration by Examiners before Appeal Proceedings and Reconsideration Report by Examiner before Appeal issued by the Japan Patent Office for corresponding Japanese Patent Application No. 2021-518155, mailed on Apr. 18, 2023, with an English translation.
First Notification of Office Action and Search Report issued by the China National Intellectual Property Administration for corresponding Chinese Patent Application No. 201880097871.6, mailed on May 27, 2023, with an English translation.

* cited by examiner

RANDOM ACCESS CONFIGURATION METHOD, SIGNAL TRANSMISSION METHOD, APPARATUSES THEREOF AND SYSTEM

CROSS-REFERENCE TO RELATED APPLICATION

This application is a continuation application of International Application PCT/CN2018/113846 filed on Nov. 2, 2018 and designated the U.S., the entire contents of which are incorporated herein by reference.

FIELD

This disclosure relates to the field of communication technologies, and in particular to a random access configuration method, a signal transmission method, apparatuses thereof and a system.

BACKGROUND

Listen Before Talk (LBT) is a channel access mechanism that enables identical spectral resources to be shared efficiently between wireless local area networks. Since availability of channels on unlicensed frequency bands cannot be guaranteed all the times, LBT requires devices to detect the channels before transmitting data, perform channel assessment, and transmit data when assessment results are that the channels are idle.

Two types of LBT, i.e. LBT with random back-off with variable size of contention window and LBT with fixed time length (such as 25 us), are adopted by license assisted access (LAA) of long term evolution (LTE).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in New Radio (NR) Release 15 (Rel-15), licensed frequency bands are only taken into account in the random access design, as the random access of the unlicensed frequency bands needs to take influence of channel access into account, it is necessary to enhance or redesign the random access.

In particular, according to the random access design in Rel-15 of NR, random access resources may be neighboring in time. If the unlicensed frequency bands are taken into account, suppose that, before transmitting msg.1 by using random access resources, a terminal equipment needs to detect channels and transmit msg.1 only after detecting that the channels are idle, the above random access resources neighboring in time are unable to be used for transmission of msg.1 from different terminal equipments, thereby resulting in waste of resources, lowering spectral efficiency, and increasing random access latency.

In order to solve at least one of the above problems or other similar problems, embodiments of this disclosure provide a random access configuration method, a signal transmission method, apparatuses thereof and a system.

According to a first aspect of the embodiments of this disclosure, there is provided a random access configuration method, the method including:

transmitting first indication information to a terminal equipment, the first indication information including at least one of the following information:
random access channel configuration index (first index);
time gap between random access resources which are neighboring to each other in time domain;
invalid random access resource(s);
at least two time-domain starting positions of a random access resource;
time-domain ending position of a random access resource;
number of channel access attempts; and
type of channel access.

According to a second aspect of the embodiments of this disclosure, there is provided a signal transmission method, the method including:

determining a third random access resource set by a terminal equipment; and
transmitting a first message by the terminal equipment on a fifth random access resource according to a result of channel detection before a time-domain starting position of a random access resource in the third random access resource set, the third random access resource set including the fifth random access resource.

According to a third aspect of the embodiments of this disclosure, there is provided a random access configuration apparatus, configured in a network device, the apparatus including:

a first transmitting unit configured to transmit first indication information to a terminal equipment, the first indication information including at least one of the following information:
random access channel configuration index (first index);
time gap between random access resources which are neighboring to each other in time domain;
invalid random access resource(s);
at least two time-domain starting positions of a random access resource;
time-domain ending position of a random access resource;
number of channel access attempts; and
type of channel access.

According to a fourth aspect of the embodiments of this disclosure, there is provided a signal transmission apparatus, configured in a terminal equipment, the apparatus including:

a determining unit configured to determine a third random access resource set; and
a transmitting unit configured to transmit a first message on a fifth random access resource according to a result of channel detection before a time-domain starting position of a random access resource in the third random access resource set, the third random access resource set including the fifth random access resource.

According to a fifth aspect of the embodiments of this disclosure, there is provided a network device, including the apparatus as described in the third aspect.

According to a sixth aspect of the embodiments of this disclosure, there is provided a terminal equipment, including the apparatus as described in the fourth aspect.

According to a seventh aspect of the embodiments of this disclosure, there is provided a communication system, including the network device as described in the fifth aspect and the terminal equipment as described in the sixth aspect.

According to another aspect of the embodiments of this disclosure, there is provided a computer readable program, which, when executed in a network device, will cause a computer to carry out the method described in the first aspect in the network device.

According to a further aspect of the embodiments of this disclosure, there is provided a storage medium storing a computer readable program, which will cause a computer to carry out the method described in the first aspect in a network device.

According to yet another aspect of the embodiments of this disclosure, there is provided a computer readable program, which, when executed in a terminal equipment, will cause a computer to carry out the method described in the second aspect in the terminal equipment.

According to still another aspect of the embodiments of this disclosure, there is provided a storage medium storing a computer readable program, which will cause a computer to carry out the method described in the second aspect in a terminal equipment.

An advantage of the embodiments of this disclosure exists in that sufficient time gaps between neighboring random access resources are guaranteed by method of configuration or predefinition so as to perform LBT detection, or msg.1 is transmitted at different starting positions or different random access resources according to a LBT detection result, thereby avoiding waste of resources, lowering random access latency, and improving spectral efficiency.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
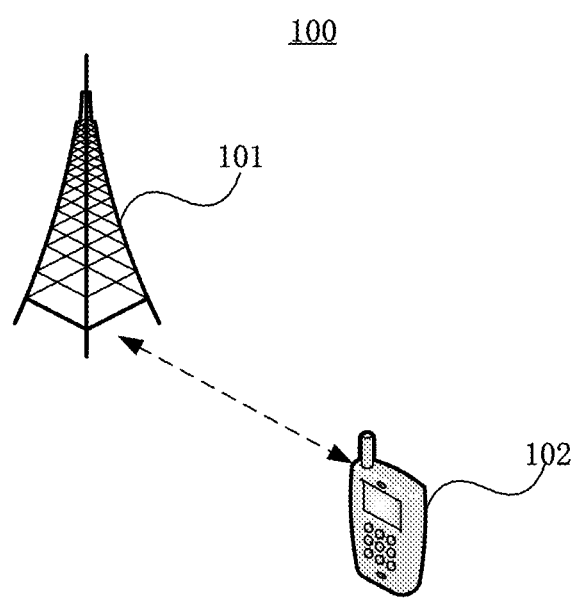
FIG. 1 is a schematic diagram of a communication system of an embodiment.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

In the above embodiments, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

In the above embodiments, the terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and a terminal equipment 102. For the sake of simplicity, description is given in FIG. 1 by taking one terminal equipment as an example. And the network device 101 is, for example, a network device gNB of NR.

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

In the above communication system, the terminal equipment 102 may transmit data to the network device 101, for example, in a grant-free transmission mode. The network device 101 may receive data transmitted by one or more terminal equipments 102, and feed back information (such as acknowledgement ACK/non-acknowledgement NACK) to the terminal equipment 102, and the terminal equipment 102 may acknowledge terminating a transmission process according to the feedback information, or may further perform new data transmission, or may perform data retransmission.

Figure 2A:
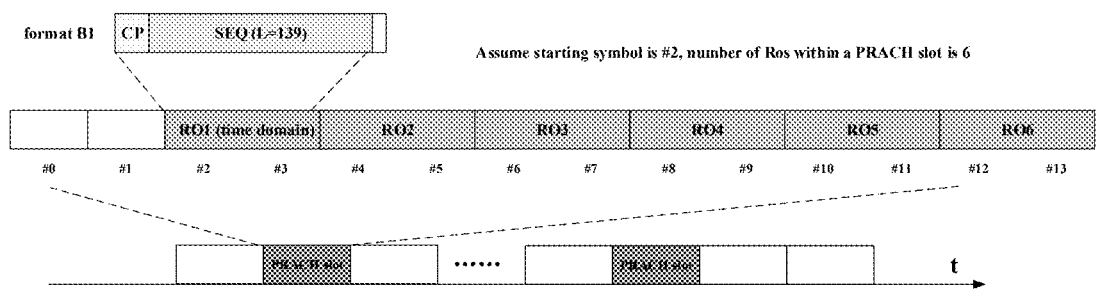
FIG. 2A is a schematic diagram of a random access resource in NR.

It was found by the inventors that in the random access configuration of NR Rel-15, as for the physical random access channel format of short sequences (referred to as a PRACH format, also referred to as a preamble format), such as formats A1/A2/A3/B1/B2/B3, etc., time-domain random access resources (referred to as time-domain PRACH occasions, or neighboring random access resources in the time domain) configured in a PRACH slot are continuous in the time domain, or there is no time gap therebetween in the time domain. FIG. 2a schematically shows a configuration situation by taking format B1 as an example. The PRACH slot refers to a slot including random access resources, each slot including 14 symbols (#0~#13).

Figure 2B:
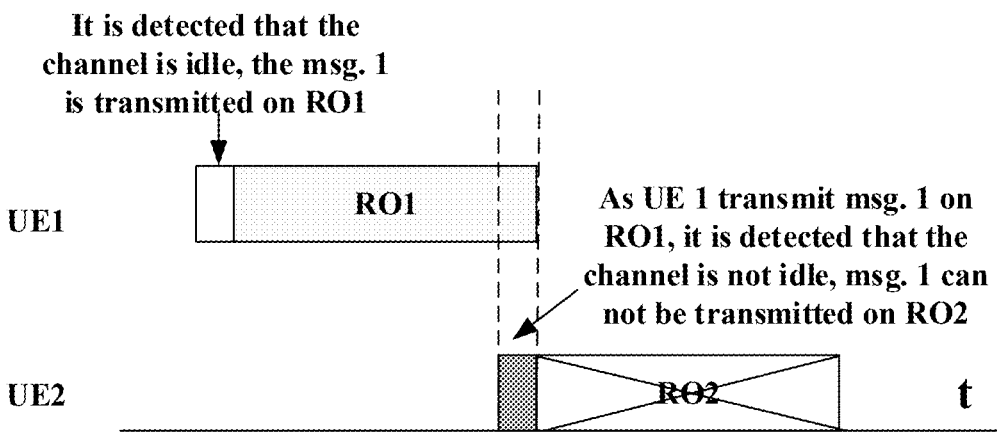
FIG. 2B is a schematic diagram of channel detection performed by a terminal equipment.

However, for an unlicensed band (or a sharing band), before transmitting msg.1 by using a random access resource, the terminal equipment may need to perform channel detection and transmit msg.1 after detecting that the channel is idle. As shown in FIG. 2b, suppose that UE1 selects RO1 and UE2 selects RO2, if UE1 transmits msg.1 on RO1, UE2 will not be able to transmit msg.1 on RO2, and may only reselect a subsequent RO. Therefore, if the unlicensed band (or the sharing band) adopts random access configuration identical to that in NR Rel-15, it may cause waste of resources, reduce spectral efficiency, and increase random access latency.

Implementations of the embodiments of this disclosure shall be described below with reference to the accompanying drawings. These implementations are illustrative only, and are not intended to limit this disclosure.

Embodiment 1

Figure 3:
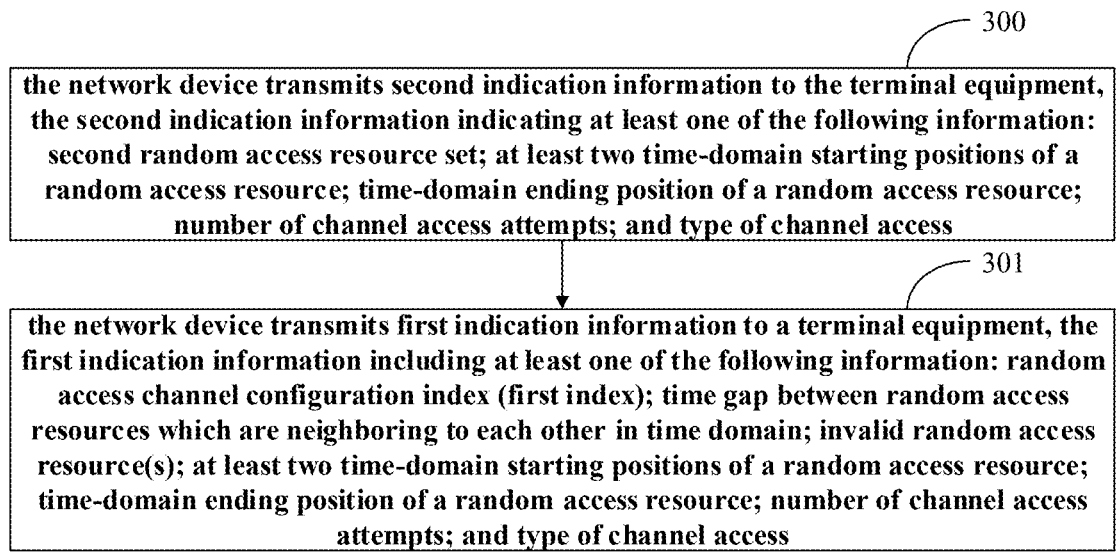
FIG. 3 is a schematic diagram of the random access configuration method of Embodiment 1.

The embodiment of this disclosure provides a random access configuration method, applicable to a network device, such as the above-described gNB, etc. FIG. 3 is a schematic diagram of the random access configuration method of this embodiment. As shown in FIG. 3, the method includes:

step 301: the network device transmits first indication information to a terminal equipment, the first indication information including at least one of the following information: random access channel configuration index (first index); time gap between random access resources which are neighboring to each other in time domain; invalid random access resource(s); at least two time-domain starting positions of a random access resource; time-domain ending position of a random access resource; number of channel access attempts; and type of channel access.

In this embodiment, sufficient time gaps or more opportunities between neighboring random access resources may be guaranteed by the random access configuration method for performing channel detection, and the terminal equipment may perform channel detection accordingly and transmit msg.1 on a random access resource, thereby avoiding waste of resources, lowering random access latency, and improving spectral efficiency.

In this embodiment, the random access resource is also referred to as a PRACH resource, a PRACH occasion, or an RACH occasion (RO), which is a time-frequency resource that may be used to transmit a first message (msg. 1). Frequency-domain resources of a random access resource may be continuous or discontinuous.

In this embodiment, the above first index may correspond to a random access channel configuration in a first random access channel configuration set (referred to as a first list). The above first list may include at least one of the following parameters: time gap between random access resources which are neighboring to each other in time domain; invalid random access resource; time-domain starting position of a random access resource in a slot; candidate time-domain starting position of a random access resource; time-domain ending position of a random access resource; number of channel access attempts; and type of channel access.

In this embodiment, the random access channel configuration in the first list may only include the time-domain position configuration of the random access resource.

In this embodiment, by indicating the above first index, the terminal equipment may determine the random access channel configuration to which the first index corresponds, and determine at least one of the above parameters accordingly. And then, the terminal equipment may determine available random access resources according to at least one of the above parameters, and transmit msg.1 by using appropriate random access resources through channel detection, which shall be described in Embodiment 2.

In this embodiment, the above first list may be a new list. For example, at least one random access channel configuration in the first list is not used for licensed frequency bands, that is, the first list includes at least one random access channel configuration used only for unlicensed frequency bands (or sharing bands). However, this embodiment is not limited thereto, and the first list may also follow a list of a current NR, or add new configuration into the list of the current NR. For example, at least one random access channel configuration in the first list is not used for unlicensed frequency bands (or sharing bands), that is, the first list contains at least one random access channel configuration used only for licensed frequency bands. Reference may be made to existing standards for the list of the current NR, such as table 6.3.3.2-3, and table 6.3.3.2-4, etc., which shall not be described herein any further.

In this embodiment, if parameters in the first list include a time gap of random access resources neighboring in the time domain, the first list is, for example, as shown in Table 1. The time gap of the random access resources neighboring in the time domain may be characterized by the number of symbols, or an absolute time length (such as us), or a second index.

If the time gap is characterized by the number of symbols, corresponding to different subcarrier spacings (SCSs), the time gap (the number of symbols) may be of different values. For example, if a subcarrier spacing of the random access resources is 15 kHz or 30 kHz, the number of spaced symbols is at least 1, and if a subcarrier spacing of the random access resources is 60 kHz or 120 kHz, the number of spaced symbols is at least 2.

If the time gap is characterized by the second index, the number of spaced symbols or the absolute time length may be determined by the second index and the SCS, as shown in Table 2; and if the time gap indicated in the table is "2", the SCS is 120 kHz, and by looking up Table 2, the number of spaced symbols or the absolute time length may be determined to be "4".

TABLE 1

| PRACH configuration index | Preamble format | $n_{SFN}$ mod $x = y$ | | Subframe number or slot number | Starting symbol | Number of PRACH slots within a subframe | $N_t^{RA,\ slot}$, number of time-domain PRACH occasions within a PRACH slot | Time gap between neighboring time-domain PRACH occasions within a PRACH slot | $N_{dur}^{RA}$, PRACH duration |
|---|---|---|---|---|---|---|---|---|---|
| | | x | y | | | | | | |
| 0 | A1 | 16 | 0 | 4, 9 | 0 | 1 | 1 | 1 | 2 |
| 1 | A1 | 16 | 1 | 4 | 7 | 2 | 2 | 2 | 2 |
| ... | | | | | | | | | |
| N-2 | C0 | 4 | 0 | 4, 9 | 2 | 1 | 1 | 1 | 6 |
| N-1 | C0 | 4 | 0 | 4 | 8 | 2 | 2 | 2 | 6 |

TABLE 2

| | SCS | | | |
|---|---|---|---|---|
| index | 15 kHz | 30 kHz | 60 kHz | 120 kHz |
| 1 | 1 | 1 | 2 | 2 |
| 2 | 2 | 3 | 3 | 4 |
| ... | | | | |
| M | 4 | 5 | 6 | 10 |

In this embodiment, if the parameters in the first list include a time-domain starting position of a random access resource in a slot, the first list is shown in Table 3, for example. In this embodiment, a time-domain starting position of a random access resource in a slot to which at least one random access channel configuration corresponds includes at least two starting positions, such as a random access channel configuration with an index "1", or a random access channel configuration with an index "N−2"; wherein each starting position corresponds respectively to a group of random access resources (PRACH occasions) with identical time-domain starting positions.

TABLE 3

| PRACH configuration index | Preamble format | $n_{SFN}$ mod $x = y$ | | Subframe number or slot number | Starting symbol within a PRACH slot | Number of PRACH slots within a subframe | $N_{dur}^{RA}$, PRACH duration |
|---|---|---|---|---|---|---|---|
| | | x | y | | | | |
| 0 | A1 | 16 | 0 | 4, 9 | {0} | 1 | 2 |
| 1 | A1 | 16 | 1 | 4 | {0, 3, 6, 9, 12} | 2 | 2 |
| ... | | | | | | | |
| N-2 | C0 | 4 | 0 | 4, 9 | 0 | 1 | 6 |
| N-1 | C0 | 4 | 0 | 4 | {6, 9, 12} | 2 | 6 |

In this embodiment, if the parameters in the first list include a candidate time-domain starting position of a random access resource, the first list is as shown in Table 4, for example. In this embodiment, a candidate time-domain starting position of a random access resource to which at least one random access channel configuration corresponds includes at least two time-domain starting positions, such as a random access channel configuration with an index 0 shown in Table 4, or a random access channel configuration with an index N-2 shown in Table 4. In this embodiment, each candidate time-domain starting position of a random access resource corresponds respectively to a channel access attempt opportunity. The candidate time-domain starting position is, for example, characterized as a relative symbol position in a random access resource. As shown in Table 4, "0" in the second column from the bottom denotes a first symbol in the random access resource, "1" in the second column from the bottom denotes a second symbol, and so on.

boring random access resources for channel detection, and the terminal equipment may perform channel detection accordingly and transmit msg.1 on a random access resource, which shall be described in detail in Embodiment 2.

In this embodiment, the time gap may be a time gap between a first symbol of a random access resource and a last symbol of a preceding neighboring random access resource; however, this embodiment is not limited thereto, and the time gap may also be an absolute time length or number of symbols.

In this embodiment, by indicating unavailable random access resources, it is ensured that there are sufficient time gaps between neighboring random access resources for channel detection, and the terminal equipment may perform channel detection accordingly and transmit msg.1 on a random access resource, which shall be described in detail in Embodiment 2.

TABLE 4

| PRACH configuration index | Preamble format | $n_{SFN}$ mod $x = y$ | | Subframe number or slot number | Starting symbol | Number of PRACH slots within a subframe | $N_t^{RA, slot}$, number of time-domain PRACH occasions within a PRACH slot | Candidate starting symbol of time-domain PRACH occasion | $N_{dur}^{RA}$, PRACH duration |
|---|---|---|---|---|---|---|---|---|---|
| | | x | y | | | | | | |
| 0 | A1 | 16 | 0 | 4, 9 | 0 | 1 | 1 | {0, 1} | 2 |
| 1 | A1 | 16 | 1 | 4 | 7 | 2 | 2 | {1} | 2 |
| ... | | | | | | | | | |
| N-2 | C0 | 4 | 0 | 4, 9 | 2 | 1 | 1 | {0, 1} | 6 |
| N-1 | C0 | 4 | 0 | 4 | 8 | 2 | 2 | {1} | 6 |

In this embodiment, if the parameters in the first list include a time-domain ending position of a random access resource, the number of channel access attempts, or a channel access type, the form of the first list is similar to those of tables 1-4, and shall not be described herein any further.

In this embodiment, if the above first list is a newly-added list, the first indication information may indicate the random access configuration via the above first index only, that is, the first indication information may only include the above first index; however, this embodiment is not limited thereto, and in a case where the above first list is a newly-added list or a list following NR, the above first indication information may also include the above first index and at least one piece of information other than the first index in step 301 to indicate the random access configuration.

In this embodiment, by indicating the time gap of the random access resources neighboring in the time domain, it is ensured that there are sufficient time gaps between neigh- In this embodiment, as an indication mode of the unavailable random access resources, the above first indication information may indicate that an even-numbered random access resource in a random access channel slot (PRACH slot) is unavailable, or indicate that an odd-numbered random access resource in a random access channel slot (PRACH slot) is unavailable, or indicates that only a first random access resource in a PRACH slot is available, or indicates a mask of a random access resource, the mask indicating which random access resources are available random access resources, and which random access resources are unavailable random access resources.

In this embodiment, at least two time-domain starting positions of a random access resource is indicated, which is equivalent to indicating at least two channel access opportunities of a random access resource. Based upon this, the terminal equipment may transmit msg.1 at a time-domain starting position of the random access resource by channel detection, which shall be described in detail in Embodiment 2.

In this embodiment, by indicating the time-domain ending position of a random access resource, it is ensured that there are sufficient time gaps between the random access resource and its following neighboring random access resources for channel detection, and the terminal equipment may perform channel detection accordingly and transmit msg.1 at a subsequent random access resource.

In this embodiment, the time-domain ending position may be characterized as, for example, a relative symbol position in a random access resource. For example, if a preamble format to which a random access resource corresponds is format B2, according to NR Rel-15, format B2 corresponds to 4 symbols. If the time-domain ending position indicates that the random access resource ends at a third symbol, the terminal equipment does not transmit data at a fourth symbol, which shall be described in detail in Embodiment 2.

In this embodiment, by indicating the number of channel access attempts, the terminal equipment has more opportunities to perform channel detection and transmit msg.1 on a random access resource, thereby effectively avoiding waste of resources, reducing random access latency, and improving the spectral efficiency.

In this embodiment, the number of channel access attempts may be a maximum number of channel access attempts to which a random access resource corresponds, or the number of channel access attempts may be the number of random access resources that may be selected by the terminal equipment for one time of transmission of msg.1, or the number of channel access attempts may be a maximum number of channel access attempts to which all random access resources that may be selected by the terminal equipment for one time of transmission of msg.1 correspond, which shall be described in detail in Embodiment 2.

In this embodiment, by indicating the type of channel access, the terminal equipment may be assisted in performing corresponding channel access attempt. For example, the type of channel access includes channel access with a short detection time (such as 25 us) (or called one shot LBT) or performing no channel access (no LBT). The terminal equipment accesses to a channel at a shorter time accordingly to transmit msg.1 on a random access resource, thereby effectively avoiding waste of resources, reducing random access latency, and improving the spectral efficiency, which shall be described in detail in Embodiment 2.

In this embodiment, the first indication information is used to indicate random access configuration, the random access configuration may include configuration of a first random access resource set and/or configuration of channel access. That is, with the above first indication information, the configuration of the first random access resource set and/or the configuration of channel access may be performed for the terminal equipment.

In this embodiment, with reference to the names of the RRC messages in NR Rel-15, the random access configuration is referred to as, for example, RACH-ConfigGeneric, RACH-ConfigCommon, and RACH-ConfigDedicated, etc. Or, a new name is adopted for an unlicensed frequency band (or a sharing band), and the random access configuration is referred to as, for example, RACH-ConfigGeneric_unlicense, and RACH-ConfigCommon_unlicnes, etc.; however, this embodiment is not limited thereto.

Figure 4:
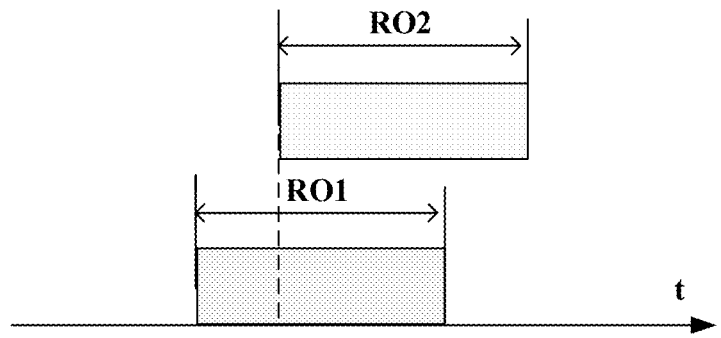
FIG. 4 is a schematic diagram of an example of a time-domain location relationship between a first random access resource and a second random access resource.

In this embodiment, the first random access resource set includes available random access resources, such as a first random access resource and a second random access resource, the first random access resource and the second random access resource may overlap in the time domain. For example, a time-domain starting position of the second random access resource is before a time-domain starting position of the first random access resource. Thus, the terminal equipment may perform channel detection (such as LBT) on the available random access resources overlapping in the time domain, and transmit msg.1 at one random access resource, which shall be described in detail in Embodiment 2. FIG. 4 is an example of a time-domain relationship between the first random access resource and the second random access resource, and this disclosure is not limited thereto.

In this embodiment, all the random access resources included in the above first random access resource set may be located in a bandwidth part (BWP), such as in a first uplink (UL) BWP; however, this embodiment is not limited thereto, and all the random access resources in the above first random access resource set may also correspond to identical preamble format (such as A1/A2 . . . ).

In this embodiment, the above first indication information may be transmitted via a system message, or may be transmitted via radio resource control (RRC) signaling, or may be transmitted via a system message and RRC signaling together, in particular, for example, it may be transmitted via SIB 1, BWP-UplinkCommon, BWP-UplinkDedicated, and beamFailureRecoveryConfig, etc., and this embodiment is not limited thereto. Furthermore, in addition to the information mentioned in step 301, the first indication information may include other information for indicating random access configuration, such as including information indicating frequency-domain position of random access resources, and reference may be made to the related art for details, which shall not be described herein any further.

In this embodiment, the random access procedure may be triggered by a terminal equipment or a network device. If it is triggered by a terminal equipment, the terminal equipment performs random access according to the random access configuration indicated by the above first indication information, and reference may be made to the related art for a particular random access procedure, which shall not be described herein any further. If it is triggered by a network device, as shown in FIG. 3, the method further includes:

step 300: the network device transmits second indication information to the terminal equipment, the second indication information indicating at least one of the following information: second random access resource set; at least two time-domain starting positions of a random access resource; time-domain ending position of a random access resource; number of channel access attempts; and type of channel access.

In this embodiment, the above second indication information is used to trigger the terminal equipment to perform random access, that is, the network device may indicate the terminal equipment to perform random access via at least one of the above items.

In this embodiment, the above second random access resource set includes available random access resources, such as a third random access resource and a fourth random access resource. The third random access resource and the fourth random access resource may overlap in the time domain, and a relationship therebetween may be identical to the relationship between the first random access resource and the second random access resource as described above, which shall not be described herein any further, and this embodiment is not limited thereto.

In this embodiment, the random access resources in the second random access resource set may not be completely identical to the random access resources in the configuration of the first random access resource set indicated by the first indication information, for example, at least one random access resource in the second random access resource set may not belong to the above first random access resource set. However, this embodiment is not limited thereto, and the random access resources in the first random access resource set and the random access resources in the second random access resource set may also be identical.

In this embodiment, the above second indication information may be transmitted via RRC signaling, and may also be transmitted via a physical message control channel (PDCCH), and this embodiment is not limited thereto. Furthermore, in addition to the information mentioned in step 300, the second indication information may further include other information for triggering random access. Reference may be made to the related art for detail, which shall not be described herein any further.

In this embodiment, the above first indication information may further include a list index, which is used to indicate a list. The list here may be the above first list, or may be another list, that is, in addition to corresponding to a random access channel configuration in the first list above, the above first index may further correspond to random access channel configurations of other lists, such as correspond to a random access channel configuration of a second random access channel configuration set (referred to as a second list). That is, in this embodiment, the random access channel configuration set may be implemented via a list or multiple lists, which increases flexibility of random access channel configuration.

With the method of this embodiment, sufficient time gaps or more opportunities between neighboring random access resources may be guaranteed for performing channel detection, and the terminal equipment may perform channel detection accordingly and transmit msg.1 on a random access resource, thereby avoiding efficiently waste of resources, lowering random access latency, and improving spectral efficiency.

Embodiment 2

The embodiment of this disclosure provides a signal transmission method, applicable to a terminal equipment, such as the UE described above. This method is processing at a terminal equipment side corresponding to the method of Embodiment 1, with contents identical to those in Embodiment 1 being not going to be described herein any further.

Figure 5:
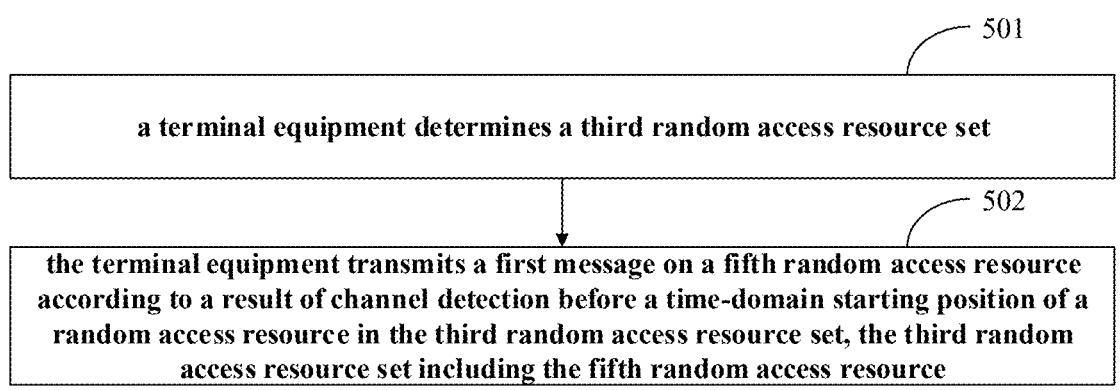
FIG. 5 is a schematic diagram of the signal transmission method of Embodiment 2.

FIG. 5 is a schematic diagram of the signal transmission method of this embodiment. As shown in FIG. 5, the method includes:
step 501: a terminal equipment determines a third random access resource set; and
step 502: the terminal equipment transmits a first message on a fifth random access resource according to a result of channel detection before a time-domain starting position of a random access resource in the third random access resource set, the third random access resource set including the fifth random access resource.

In this embodiment, the terminal equipment determines a random access resource to transmit msg.1 according to the detection result before a time-domain starting position of the random access resource in the third random access resource set, which effectively avoids waste of resources, reduces random access latency, and improves spectral efficiency.

In one implementation of this embodiment, the terminal equipment may receive first indication information transmitted by the network device, the first indication information indicating configuration of the first random access resource set, and the terminal equipment determines the first random access resource set according to the first indication information (that is, according to the configuration), and selects the above third random access resource set from the first random access resource set. Thus, the terminal equipment may determine the above available random access resources according to the received first indication information, and as the first indication information ensures that there are sufficient time gaps between neighboring random access resources in the time domain for channel detection, the terminal equipment may determine a random access resource to transmit msg.1 according to the detection result, thereby effectively avoiding waste of resources, reducing random access latency, and improving spectral efficiency.

In this embodiment, contents of the first indication information have been described in Embodiment 1, which are incorporated here, and shall not be described herein any further.

In this embodiment, if the configuration of the first random access resource set specifies the first random access resource set, the terminal equipment may directly determine the first random access resource set accordingly, that is, the terminal equipment may determine the first random access resource set according to the above first indication information; and if the configuration of the first random access resource set does not specify the first random access resource set, the terminal equipment may determine the first random access resource set combining a predefined or pre-configured rule, that is, the terminal equipment determines the first random access resource set according to the above first indication information and a predefined or pre-configured rule.

In this implementation, the rule is any one of the following:
only the first random access resource in a slot is valid;
only an odd numbered random access resource in a slot is valid; and
only an even numbered random access resource in a slot is valid.

The above rule is an example only, and this embodiment is not limited thereto.

In this embodiment, a higher layer (such as an MAC layer) of the terminal equipment may select (also referred to as determining) a part of the random access resources from the above first random access resource set for channel detection, and a set formed by these selected random access resources is referred to as a third random access resource set. The higher layer of the terminal equipment informs a physical layer of the terminal equipment of the third random access resource set, and the physical layer detects a channel before a time-domain starting position of a random access resource in the third random access resource set; and if the channel is detected as being idle before the time-domain starting position of a random access resource and msg.1 is transmitted on the random access resource, this random access resource is called a fifth random access resource.

In this implementation, as described in Embodiment 1, the above first indication information may further include the number of channel access attempts, and the terminal equipment may further select a corresponding number of random access resources from the first random access resource set according to the number of channel access attempts and take them as the third random access resource set. For example, the terminal equipment first determines the number of random access resources in the third random access resource set according to the number of channel access attempts, and then selects a corresponding number of random access resources from the first random access resource set according to the determined number and takes them as the third random access resource set. For example, each random access resource corresponds to two channel access attempts, and if the number of channel access attempts indicated by the first indication information is 4, two random access resources are selected from the first random access resource set and are taken as the third random access resource set.

In another implementation of this embodiment, the terminal equipment may receive second indication information transmitted by the network device, the second indication information indicating a second random access resource set, and the terminal equipment may determine the above third random access resource set according to the second random access resource set. Here, the third random access resource set is the second random access resource set. That is, in this implementation, the network device directly indicates the third random access resource set.

In this implementation, contents of the second indication information have been described in Embodiment 1, which are incorporated here, and shall not be described herein any further.

In this embodiment, the above channel detection may also be referred to as channel access detection or LBT detection, etc., and a wording regarding channel detection is not limited in this embodiment.

Figure 6:
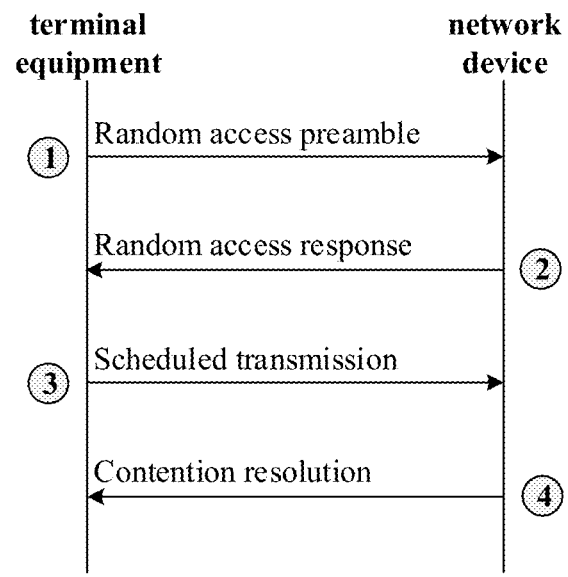
FIG. 6 is a schematic diagram of an example of msg.1.
Figure 7:
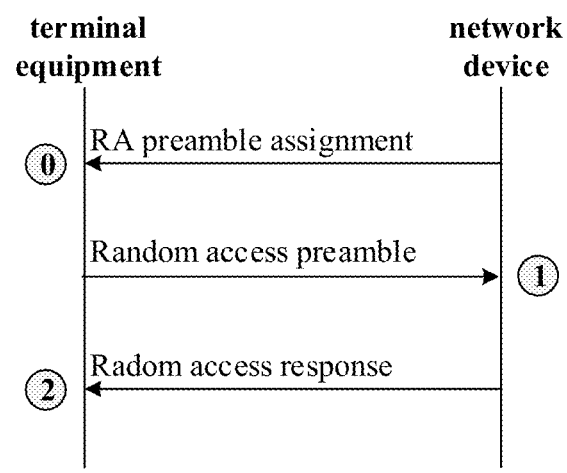
FIG. 7 is a schematic diagram of another example of msg.1.

In this embodiment, the above first message may also be referred to as msg.1, which includes a preamble, or includes a preamble and uplink data, and this embodiment is not limited thereto. Taking that msg.1 only includes a preamble as an example, msg.1 may be a message with a reference number 1 shown in FIG. 6 or 7; wherein FIG. 6 is a schematic diagram of contention-based random access, and FIG. 7 is a schematic diagram of random access triggered by the network device (non-contention-based).

In this embodiment, the above third random access resource set may be associated with the same downlink signal. The downlink signal is a synchronization signal block (SSB) or an NR-U DRS, wherein the SSB is an SS/PBCH block. The NR-U DRS includes at least one SSB, and may further include an RMSI, and a CSI-RS, etc., and this embodiment is not limited thereto. The same downlink signal refers to a signal corresponding to the same index. Taking the SSB as an example, the network device transmits multiple SSBs in a time period, each SSB corresponding to an index, the index characterizing a time-frequency domain position of the SSB and/or a used transmission beam of the SSB.

Figure 8:
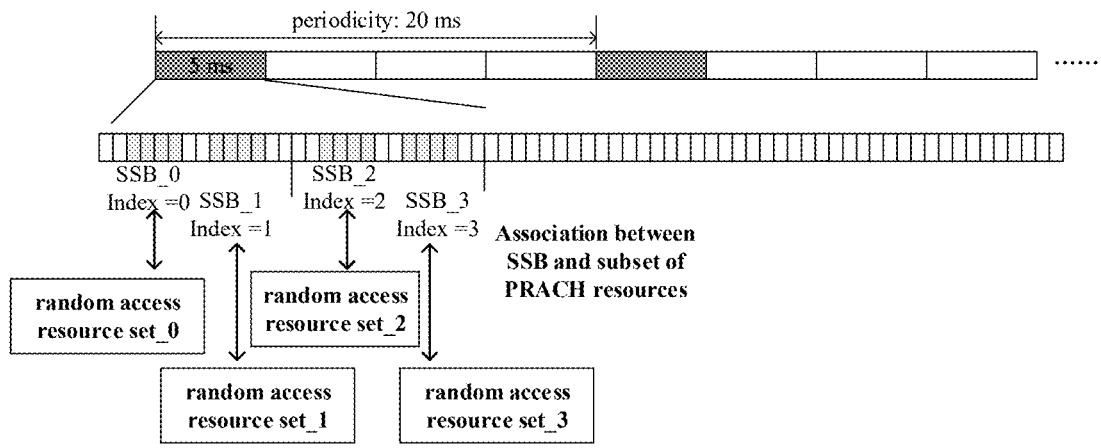
FIG. 8 is a schematic diagram of an example of a random access resource.

In this embodiment, when the network device transmits the second indication information to trigger random access, the second indication information may indicate the third random access resource set by indicating the index of the SSB; for example, the third random access resource set is random access resource set_0 in FIG. 8, a value of the SSB index included in the second indication information is 0. And the NR-U DRS is in the same way.

Figure 9:
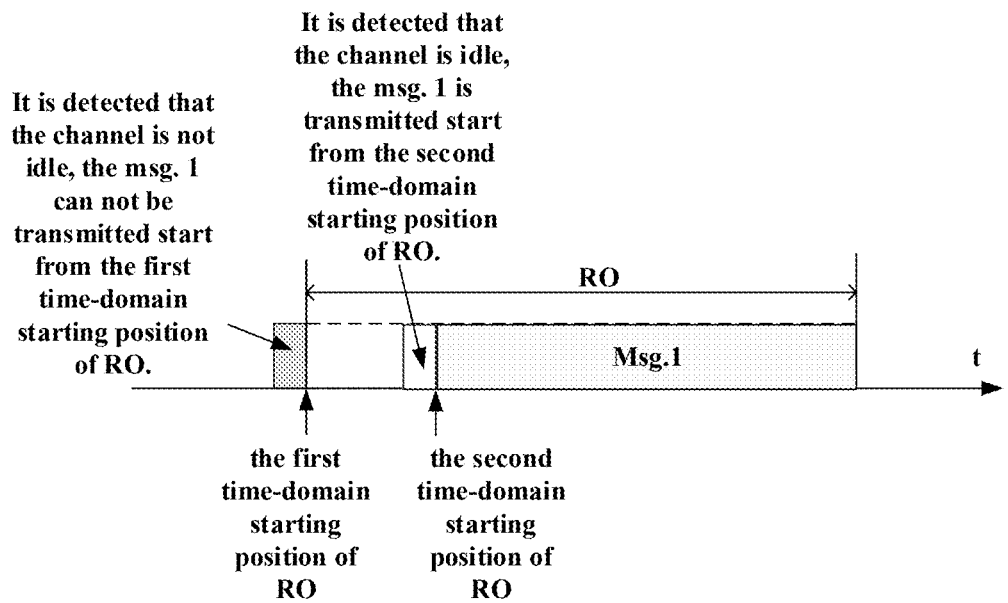
FIG. 9 is a schematic diagram of another example of the random access resource.

In this embodiment, the above fifth random access resource may include at least two time-domain starting positions, the at least two time-domain starting positions including a first time-domain starting position and a second time-domain starting position, the first time-domain starting position being before the second time-domain starting position. Thus, the terminal equipment may perform channel detection before the first time-domain starting position and/or the second time-domain starting position, and transmit the above first message starting from the first time-domain starting position or the second time-domain starting position according to the result of channel detection. FIG. 9 is an example of the fifth random access resource.

In this embodiment, a time-domain resource length occupied by the first message to which the first time-domain starting position corresponds may be greater than a time-domain resource length occupied by the first message to which the second time-domain starting position corresponds. That is, according to different time-domain starting positions, the terminal equipment may transmit first messages of different time-domain lengths, thereby ensuring that there are sufficient time gaps between neighboring random access resources for channel detection. Here, the "first message to which the time-domain starting position corresponds" means that the first message is transmitted starting from the time-domain starting position.

Figure 10:
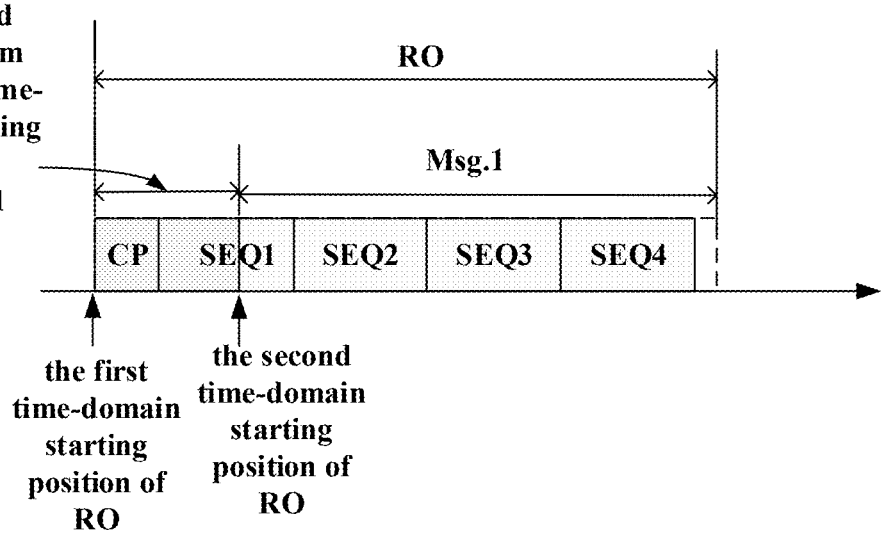
FIGS. 10-12 are schematic diagrams of three examples of puncturing msg.1.
Figure 11:
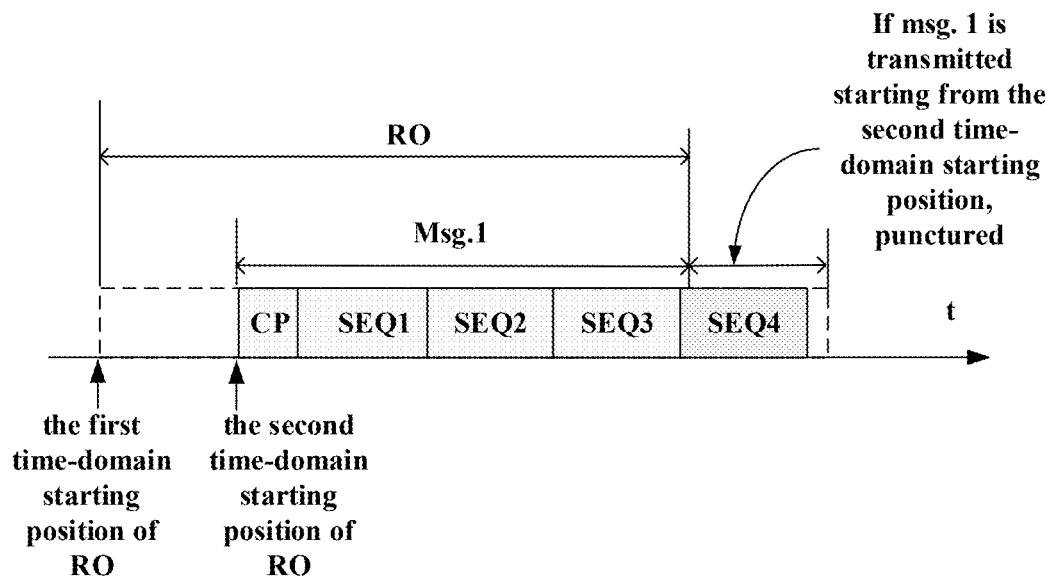
Figure 12:
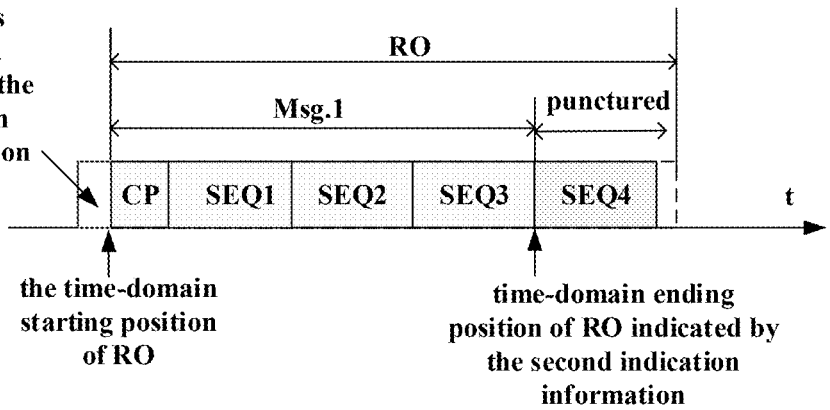

In an embodiment, the terminal equipment may transmit the first message by puncturing a part of the first message. For example, the terminal equipment may puncture a part of sequences or a part of symbols of the first message, thereby reducing the time domain length of the first message, and ensuring that the transmitted first message does not affect channel detection before time-domain starting positions of a following neighboring random access resources. Here, the puncturing a part of the sequences of the first message means not transmitting the part of the sequences of the first message, and the puncturing a part of the symbols of the first message means not transmitting sequences to which the part of the symbols corresponds. FIG. 10, FIG. 11 and FIG. 12 are three examples, respectively. The example of FIG. 12 is only used when the second indication information indicates a time-domain ending position.

In another implementation, the terminal equipment may not perform puncture transmission on the above first message, but perform overall offset transmission on the first message. For example, the time-domain resource length occupied by the first message to which the first time-domain starting position corresponds is equal to the time-domain resource length occupied by the first message to which the second time-domain starting position corresponds. That is, in this manner, the first message is transmitted only according to the determined time-domain starting position, and the time-domain resource length occupied by the first message is not changed.

In this embodiment, the third random access resource set may further include another random access resource other than the fifth random access resource, which is referred to as a sixth random access resource, and both the sixth random access resource and the fifth random access resource are random access resources that may be selected by the terminal equipment to transmit the above first message.

Figure 13:
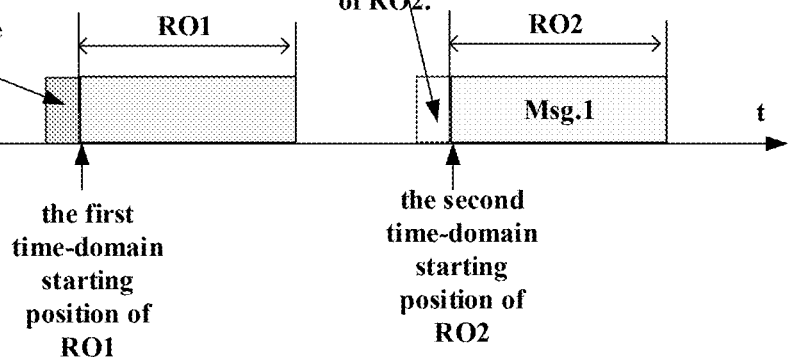
FIGS. 13 and 14 are schematic diagrams of two examples of a fifth random access resource and a sixth random access resource.
Figure 14:
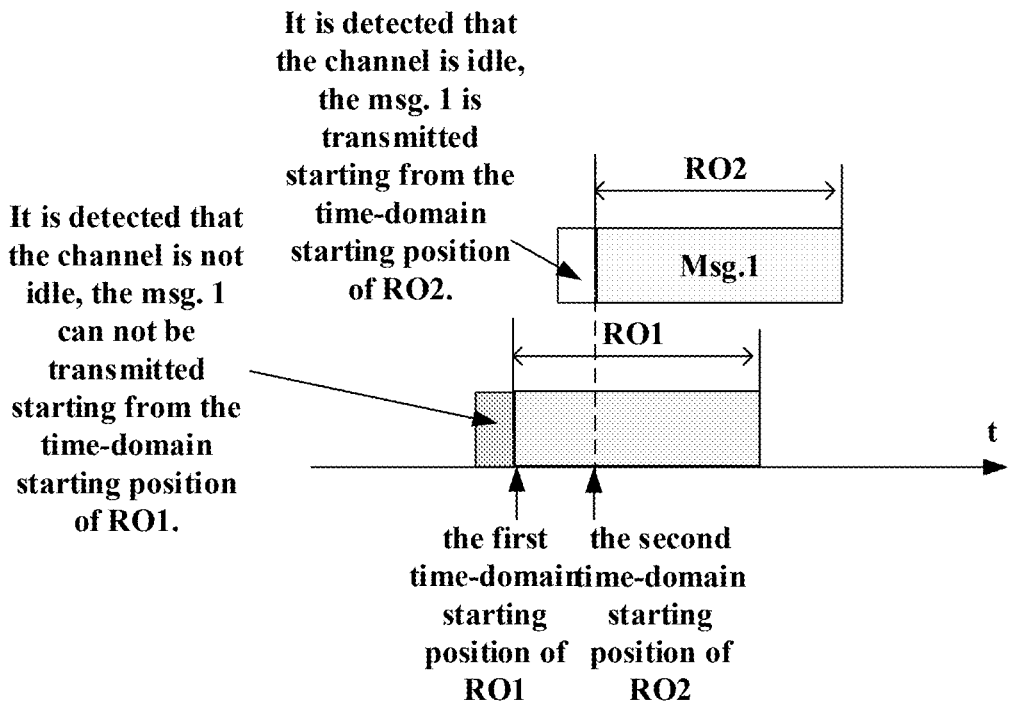

In this embodiment, a time-domain starting position of the sixth random access resource may be before a time-domain starting position of the fifth random access resource. The terminal equipment may detect the channel before any one or both of the two time-domain starting positions, until when it detects that the channel is idle, the terminal equipment transmits the first message starting from the time-domain starting position of the sixth random access resource or at the time-domain starting position of the fifth random access resource. FIGS. 13 and 14 are two examples of the fifth random access resource and the sixth random access resource; wherein RO2 corresponds to the fifth random access resource, and RO1 corresponds to the sixth random access resource.

In this embodiment, the two optional random access resources may or may not overlap in the time domain. For example, a time-domain ending position of the sixth random access resource may be before the time-domain starting position of the fifth random access resource.

In this embodiment, time-domain lengths of the two optional random access resources may be identical or different; for example, the time-domain ending position of the fifth random access resource is identical to the time-domain ending position of the sixth random access resource.

With the method of this embodiment, sufficient time gaps or more opportunities between neighboring random access resources may be guaranteed for performing channel detection, and the terminal equipment may perform channel detection accordingly and transmit msg.1 on a random access resource, or the terminal equipment may transmit msg.1 at different starting positions or different random access resources according to the result of channel detection, thereby efficiently avoiding waste of resources, lowering random access latency, and improving spectral efficiency.

Embodiment 3

The embodiment of this disclosure provides a random access configuration apparatus, configured in a network device. As principles of the apparatus for solving problems are similar to that of the method in Embodiment 1, reference may be made to the implementation of the method in Embodiment 1 for implementation of this apparatus, with identical contents being not going to be described herein any further.

Figure 15:
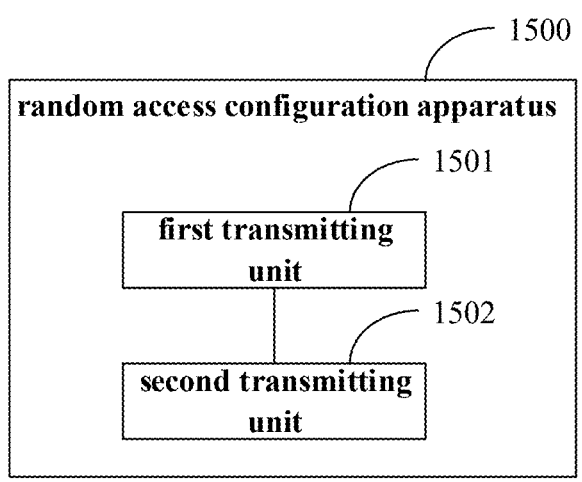
FIG. 15 is a schematic diagram of the random access configuration apparatus of Embodiment 3.

FIG. 15 is a schematic diagram of the random access configuration apparatus of this embodiment. Referring to FIG. 15, a random access configuration apparatus 1500 include a first transmitting unit 1501 configured to transmit first indication information to a terminal equipment, the first indication information including at least one of the following information:
  random access channel configuration index (first index);
  time gap between random access resources which are neighboring to each other in time domain;
  invalid random access resource(s);
  at least two time-domain starting positions of a random access resource;
  time-domain ending position of a random access resource;
  number of channel access attempts; and
  type of channel access.

Contents of the first indication information have been described in Embodiment 1, which are incorporated herein, and shall not be described herein any further.

In this embodiment, the random access channel configuration index (a first index) may correspond to a random access channel configuration in a first random access channel configuration set (a first list).

In this embodiment, the first random access channel configuration set (the first list) may include at least one of the following parameters:
  time gap between random access resources which are neighboring to each other in the time domain;
  invalid random access resource;
  time-domain starting position of a random access resource in a slot;
  candidate time-domain starting position of a random access resource;
  time-domain ending position of a random access resource;
  number of channel access attempts; and
  type of channel access.

In this embodiment, at least one random access channel configuration in the first random access channel configuration set (the first list) may not be used for a licensed frequency band; or at least one random access channel configuration in the first random access channel configuration set (the first list) may not be used for an unlicensed frequency band (or a sharing frequency band).

In this embodiment, the first indication information is used to indicate a random access configuration, the random access configuration including a configuration of a first random access resource set and/or a configuration of channel access.

In this embodiment, the configuration of the first random access resource set includes a first random access resource and a second random access resource, the first random access resource and the second random access resource may overlap in time domain, and a time-domain starting position of the second random access resource may be before a time-domain starting position of the first random access resource.

In this embodiment, all random access resources included in the configuration of the first random access resource set may be located within a first uplink bandwidth part (UL BWP) or may correspond to identical preamble formats.

In this embodiment, the first transmitting unit 1501 may transmit the first indication information via a system message and/or radio resource control (RRC) signaling.

In this embodiment, as shown in FIG. 15, the apparatus 1500 may further include:
  a second transmitting unit 1502 configured to transmit second indication information to the terminal equipment, the second indication information indicating at least one of the following information:
  second random access resource set;
  at least two time-domain starting positions of a random access resource;
  time-domain ending position of a random access resource;
  number of channel access attempts; and
  type of channel access.

Contents of the second indication information have been described in Embodiment 1, which shall not be described herein any further.

In this embodiment, the second indication information is used to trigger random access.

In this embodiment, the second random access resource set may include a third random access resource and a fourth random access resource, the third random access resource and the fourth random access resource may overlap in the time domain.

In this embodiment, a random access resource in the second random access resource set does not belong to the first random access resource set.

In this embodiment, the second transmitting unit 1502 may transmit the second indication information via radio resource control (RRC) signaling or a physical downlink control channel (PDCCH).

In this embodiment, the first indication information may further include a list index, and the random access channel configuration index (the first index) may further correspond to a random access channel configuration in a second random access channel configuration set (a second list).

With the apparatus of this embodiment, sufficient time gaps or more opportunities between neighboring random access resources may be guaranteed for performing channel detection, and the terminal equipment may perform channel detection accordingly and transmit msg.1 on a random access resource, thereby efficiently avoiding waste of resources, lowering random access latency, and improving spectral efficiency.

Embodiment 4

The embodiment of this disclosure provides a signal transmission apparatus, configured in a terminal equipment. As principles of the apparatus for solving problems are similar to that of the method in Embodiment 2, reference may be made to the implementation of the method in Embodiment 2 for implementation of this apparatus, with identical contents being not going to be described herein any further.

Figure 16:
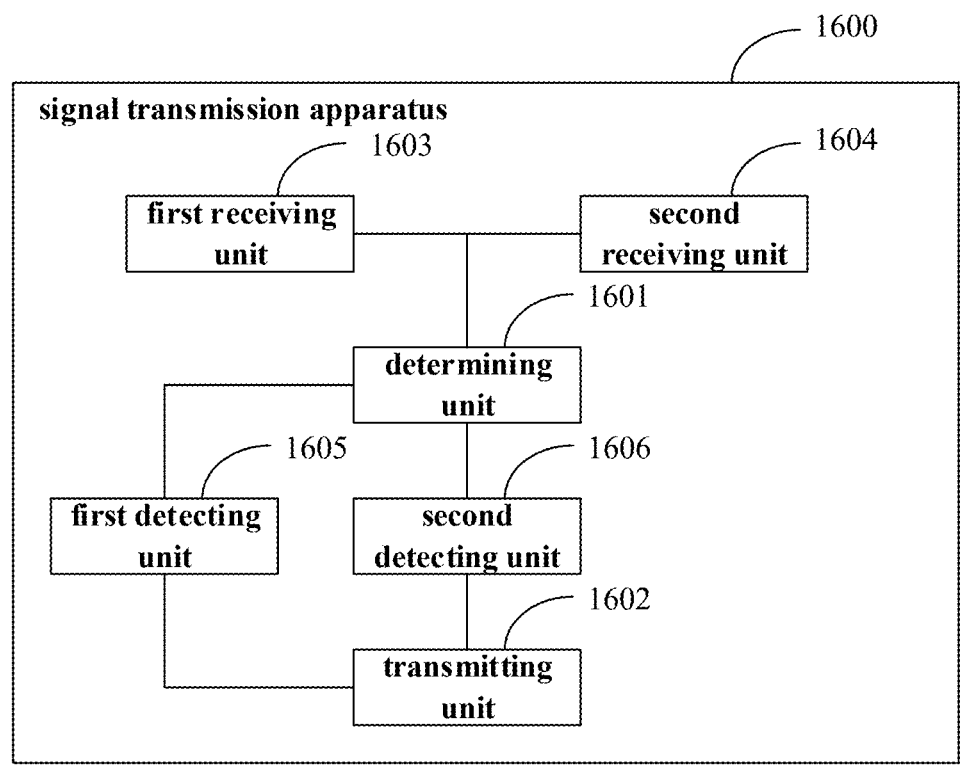
FIG. 16 is a schematic diagram of the signal transmission apparatus of Embodiment 4.

FIG. 16 is a schematic diagram of the signal transmission apparatus of this embodiment. As shown in FIG. 16, a signal transmission apparatus 1600 includes a determining unit 1601 and a transmitting unit 1602. The determining unit 1601 may determine a third random access resource set, and the transmitting unit 1602 may transmit a first message on a fifth random access resource according to a result of channel detection before a time-domain starting position of a random access resource in the third random access resource set, the third random access resource set including the fifth random access resource.

That is, the fifth random access resource is a random access resource in the third random access resource set and is a random access resource with a channel deemed as being idle according to a result of channel detection, and the transmitting unit 1602 transmits the first message on the fifth random access resource.

In one implementation of this embodiment, as shown in FIG. 16, the apparatus 1600 may further include:
a first receiving unit 1603 configured to receive first indication information transmitted by a network device, the first indication information indicating a configuration of a first random access resource set. And the determining unit 601 may determine a first random access resource set according to the first indication information, and select the third random access resource set from the first random access resource set.

In this implementation, the determining unit 1601 may determine the first random access resource set according to the first indication information and a predefined or pre-configured rule; wherein the rule may be any one of the following:
only a first random access resource in a slot is valid;
only an odd numbered random access resource in a slot is valid; and
only an even numbered random access resource in a slot is valid.

In this implementation, the first indication information may further include the number of channel access attempts, and the determining unit 701 may further determine the number of random access resources in the third random access resource set according to the number of channel access attempts, and select the third random access resource set from the first random access resource set according to the determined number.

In another implementation of this embodiment, as shown in FIG. 16, the apparatus 1600 may further include:
a second receiving unit 1604 configured to receive second indication information transmitted by the network device, the second indication information indicating a second random access resource set. And the determining unit 1601 may determine the third random access resource set according to the second random access resource set; and wherein the third random access resource set is the second random access resource set.

In this embodiment, the third random access resource set may be associated with a downlink signal, and the downlink signal is for example an SSB (SS/PBCH block) or an NR-U DRS; however, this embodiment is not limited thereto.

In this embodiment, the fifth random access resource may include at least two time-domain starting positions, the at least two time-domain starting positions including a first time-domain starting position and a second time-domain starting position, the first time-domain starting position being before the second time-domain starting position.

In this embodiment, as shown in FIG. 16, the apparatus 1600 may further include:
a first detecting unit 1605 configured to detect a channel before the first time-domain starting position and/or the second time-domain starting position; and the transmitting unit 1602 may transmit the first message starting from the first time-domain starting position or the second time-domain starting position according to a result of channel detection.

In this embodiment, a length of a time-domain resource occupied by the first message to which the first time-domain starting position corresponds may be greater than a length of a time-domain resource occupied by the first message to which the second time-domain starting position corresponds.

In this embodiment, the transmitting unit 1602 may transmit the first message by puncturing a part of the first message. For example, the transmitting unit 1602 may puncture a part of sequences or a part of symbols to which the first message corresponds.

In this embodiment, the length of the time-domain resource occupied by the first message to which the first time-domain starting position corresponds may be equal to the length of the time-domain resource occupied by the first message to which the second time-domain starting position corresponds.

In this embodiment, the third random access resource set may further include a sixth random access resource, a time-domain starting position of the sixth random access resource being before a time-domain starting position of the fifth random access resource.

In this embodiment, as shown in FIG. 16, the apparatus 1600 may further include: a second detecting unit 1606 configured to detect a channel before the time-domain starting position of the sixth random access resource and/or the time-domain starting position of the fifth random access resource. The transmitting unit 1602 may transmit the first message on the idle fifth random access resource or the idle sixth random access resource according to a detection result of the second detecting unit 1606.

In this embodiment, the fifth random access resource and the sixth random access resource may overlap in the time domain.

In this embodiment, a time-domain ending position of the sixth random access resource may be before a time-domain starting position of the fifth random access resource.

In this embodiment, a time-domain length of the fifth random access resource may be different from a time-domain length of the sixth random access resource.

In this embodiment, the time-domain ending position of the fifth random access resource may be identical to the time-domain ending position of the sixth random access resource.

With the apparatus of this embodiment, sufficient time gaps or more opportunities between neighboring random access resources may be guaranteed for performing channel detection, and the terminal equipment may perform channel detection accordingly and transmit msg.1 on a random access resource, thereby efficiently avoiding waste of resources, lowering random access latency, and improving spectral efficiency.

Embodiment 5

The embodiment of this disclosure provides a network device, such as a gNB (a base station in NR), etc.; wherein the network device includes the random access configuration apparatus 1500 described in Embodiment 3.

Figure 17:
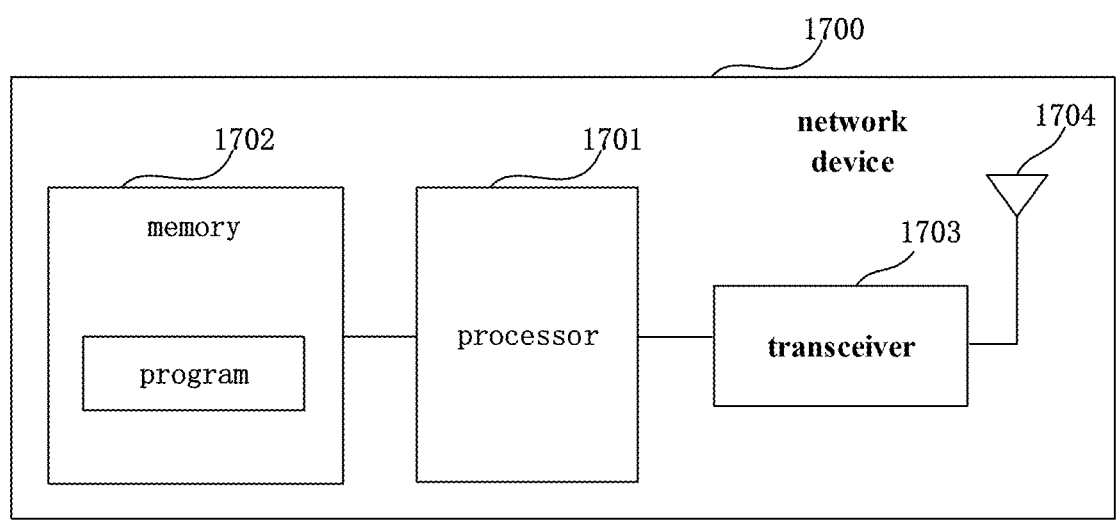
FIG. 17 is a schematic diagram of the network device of Embodiment 5.

FIG. 17 is a schematic diagram of the network device of the embodiment of this disclosure. As shown in FIG. 17, a network device 1700 may include a central processor (CPU) 1701 and a memory 1702, the memory 1702 being coupled to the central process processor 1701. The memory 1702 may store various data, and furthermore, it may store a program for information processing, and execute the program under control of the central processor 1701, so as to receive various information transmitted by a terminal equipment, and transmit various information to the terminal equipment.

In one implementation, the functions of the apparatus 1500 described in Embodiment 3 may be integrated into the central processor 1701, and the central processor 1701 executes the functions of the apparatus 1500 described in Embodiment 3. The functions of the apparatus 1500 described in Embodiment 3 are incorporated herein, and shall not be described herein any further.

In another implementation, the apparatus 1500 described in Embodiment 3 and the central processor 1701 may be configured separately; for example, the apparatus 1500 described in Embodiment 3 may be configured as a chip connected to the central processor 1701, and the functions of the apparatus 1500 described in Embodiment 3 are executed under control of the central processor 1701.

Furthermore, as shown in FIG. 17, the network device 1700 may include a transceiver 1703, and an antenna 1704, etc. Functions of the above components are similar to those in the related art, and shall not be described herein any further. It should be noted that the network device 1700 does not necessarily include all the parts shown in FIG. 17. Furthermore, the network device 1700 may include parts not shown in FIG. 17, and the related art may be referred to.

With the network device of this embodiment, waste of resources may be efficiently avoided, random access latency may be lowered, and spectral efficiency may be improved.

Embodiment 6

The embodiment of this disclosure provides a terminal equipment, including the apparatus 1600 described in Embodiment 4.

Figure 18:
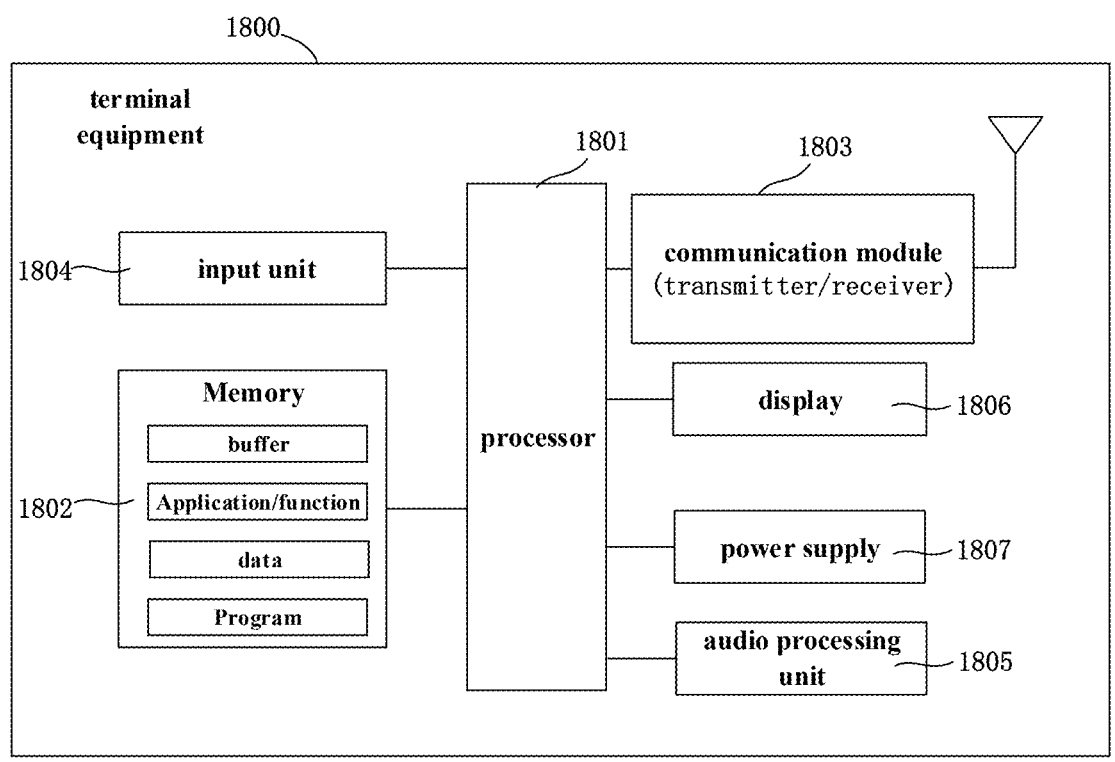
FIG. 18 is a schematic diagram of the terminal equipment of Embodiment 6.

FIG. 18 is a schematic diagram of the terminal equipment of the embodiment of this disclosure. As shown in FIG. 18, a terminal equipment 1800 may include a central processor 1801 and a memory 1802, the memory 1802 being coupled to the central processor 1801. It should be noted that this figure is illustrative only, and other types of structures may also be used, so as to supplement or replace this structure and achieve a telecommunications function or other functions.

In one implementation, the functions of the apparatus 1600 described in Embodiment 4 may be integrated into the central processor 1801, and the central processor 1801 executes the functions of the apparatus 1600 described in Embodiment 4. The functions of the apparatus 1600 described in Embodiment 4 are incorporated herein, and shall not be described herein any further.

In another implementation, the apparatus 1600 described in Embodiment 4 and the central processor 1801 may be configured separately; for example, the apparatus 1600 described in Embodiment 4 may be configured as a chip connected to the central processor 1801, and the functions of the apparatus 1600 described in Embodiment 4 are executed under control of the central processor 1801.

As shown in FIG. 18, the terminal equipment 1800 may include a communication module 1803, an input unit 1804, an audio processing unit 1805, a display 1806, and a power supply 1807, etc. It should be noted that the terminal equipment 1800 does not necessarily include all the parts shown in FIG. 18. Furthermore, the terminal equipment 1800 may include parts not shown in FIG. 18, and the related art may be referred to.

As shown in FIG. 18, the central processor 1801 is sometimes referred to as a controller or an operational control, which may include a microprocessor or other processor devices and/or logic devices. The central processor 1801 receives input and controls operations of components of the terminal equipment 1800.

In the embodiment, the memory 1802 may be, for example, one or more of a buffer memory, a flash memory, a hard drive, a mobile medium, a volatile memory, a nonvolatile memory, or other suitable devices, which may store various data, etc., and furthermore, store programs executing related information. And the central processor 1801 may execute programs stored in the memory 1802, so as to realize information storage or processing, etc. Functions of other parts are similar to those of the related art, which shall not be described herein any further. The parts of the terminal equipment 1800 may be realized by specific hardware, firmware, software, or any combination thereof, without departing from the scope of this disclosure.

With the terminal equipment of this embodiment, waste of resources may be efficiently avoided, random access latency may be lowered, and spectral efficiency may be improved.

Embodiment 7

The embodiment of this disclosure provides a communication system, including a network device and a terminal equipment. The network device is, for example, the network device 1700 described in Embodiment 5, and the terminal equipment is, for example, the terminal equipment 1800 described in Embodiment 6.

In this embodiment, the network device may be, for example, a gNB in NR, may include the function of the apparatus 1500 described in Embodiment 3, and carry out the method described in Embodiment 1. In addition, it also includes conventional compositions and functions of a network device, which are as described in Embodiment 5, and shall not be described herein any further.

In this embodiment, the terminal equipment is, for example, a UE served by a gNB, may include the functions of the apparatus 1600 described in Embodiment 4, and carry out the method described in Embodiment 2. In addition, it also includes conventional compositions and functions of a terminal equipment, which are as described in Embodiment 6, and shall not be described herein any further.

With the communication system of this embodiment, waste of resources may be efficiently avoided, random access latency may be lowered, and spectral efficiency may be improved.

An embodiment of the present disclosure provides a computer readable program, which, when executed in a network device, will cause a computer to carry out the method described in Embodiment 1 in the network device.

An embodiment of this disclosure provides a storage medium storing a computer readable program, which will cause a computer to carry out the method described in Embodiment 1 in a network device.

An embodiment of the present disclosure provides a computer readable program, which, when executed in a terminal equipment, will cause a computer to carry out the method described in Embodiment 2 in the terminal equipment.

An embodiment of this disclosure provides a storage medium storing a computer readable program, which will cause a computer to carry out the method described in Embodiment 2 in a terminal equipment.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Following supplements are further disclosed below according the various implementations of the embodiments of this disclosure.

1. A random access configuration apparatus, configured in a network device, the apparatus including:
   a first transmitting unit configured to transmit first indication information to a terminal equipment, the first indication information including at least one of the following information: random access channel configuration index (first index);
   time gap between random access resources which are neighboring to each other in time domain;
   invalid random access resource(s);
   at least two time-domain starting positions of a random access resource;
   time-domain ending position of a random access resource;
   number of channel access attempts; and
   type of channel access.

2. The apparatus according to supplement 1, wherein the random access channel configuration index (the first index) corresponds to a random access channel configuration in a first random access channel configuration set (a first list).

3. The apparatus according to supplement 2, wherein the first random access channel configuration set (the first list) includes at least one of the following parameters:
   time gap between random access resources which are neighboring to each other in time domain;
   invalid random access resource(s);
   time-domain starting position of a random access resource in a slot;
   candidate time-domain starting position(s) of a random access resource;
   time-domain ending position of a random access resource;
   number of channel access attempts; and
   type of channel access.

4. The apparatus according to supplement 2, wherein at least one random access channel configuration in the first random access channel configuration set (the first list) is not used for a licensed frequency band; or at least one random access channel configuration in the first random access channel configuration set (the first list) is not used for an unlicensed frequency band.

5. The apparatus according to any one of supplements 1-4, wherein the first indication information is used to indicate a random access configuration, the random access configuration including a configuration of a first random access resource set and/or a configuration of channel access.

6. The apparatus according to supplement 5, wherein the configuration of the first random access resource set includes a first random access resource and a second random access resource, the first random access resource and the second random access resource overlapping in time domain, and a time-domain starting position of the second random access resource being before a time-domain starting position of the first random access resource.

7. The apparatus according to supplement 5, wherein all random access resources included in the configuration of the first random access resource set are located within a first uplink bandwidth part (UL BWP) and/or correspond to identical preamble formats.

8. The apparatus according to any one of supplements 1-7, wherein the first transmitting unit transmits the first indication information via a system message and/or radio resource control (RRC) signaling.

9. The apparatus according to any one of supplements 1-8, wherein the apparatus further includes:
a second transmitting unit configured to transmit second indication information to the terminal equipment, the second indication information indicating at least one of the following information:
second random access resource set;
at least two time-domain starting positions of a random access resource;
time-domain ending position of a random access resource;
number of channel access attempts; and
type of channel access.

10. The apparatus according to supplement 9, wherein the second indication information is used to trigger random access.

11. The apparatus according to supplement 9, wherein the second random access resource set includes a third random access resource and a fourth random access resource, the third random access resource and the fourth random access resource overlapping in time domain.

12. The apparatus according to supplement 9, wherein the first indication information indicates a random access configuration, the random access configuration including the configuration of the first random access resource set, and a random access resource in the second random access resource set not belonging to the first random access resource set.

13. The apparatus according to supplement 9, wherein the second transmitting unit transmits the second indication information via radio resource control (RRC) signaling or a physical downlink control channel (PDCCH).

14. The apparatus according to any one of supplements 2-4, wherein the first indication information further includes a list index, and the random access channel configuration index (the first index) further corresponds to a random access channel configuration in a second random access channel configuration set (a second list).

1B. A signal transmission apparatus, configured in a terminal equipment, the apparatus including:
a determining unit configured to determine a third random access resource set; and
a transmitting unit configured to transmit a first message on a fifth random access resource according to a result of channel detection before a time-domain starting position of a random access resource in the third random access resource set, the third random access resource set including the fifth random access resource.

2B. The apparatus according to supplement 1B, wherein the apparatus further includes:
a first receiving unit configured to receive first indication information transmitted by a network device, the first indication information indicating a configuration of a first random access resource set;
and the determining unit determines a first random access resource set according to the first indication information, and selects the third random access resource set from the first random access resource set.

3B. The apparatus according to supplement 2B, wherein, the determining unit determines the first random access resource set according to the first indication information and a predefined or pre-configured rule, and selects the third random access resource set from the first random access resource set.

4B. The apparatus according to supplement 3B, wherein the rule is any one of the following:
only a first random access resource in a slot is valid;
only an odd numbered random access resource in a slot is valid; and
only an even numbered random access resource in a slot is valid.

5B. The apparatus according to supplement 2B, wherein the first indication information further includes the number of channel access attempts, and the determining unit determines the number of random access resources in the third random access resource set according to the number of channel access attempts, and selects the third random access resource set from the first random access resource set according to the number of random access resources.

6B. The apparatus according to supplement 1B, wherein the apparatus further includes:
a second receiving unit configured to receive second indication information transmitted by the network device, the second indication information indicating a second random access resource set;
and the determining unit determines the third random access resource set according to the second random access resource set; and wherein, the third random access resource set is the second random access resource set.

7B. The apparatus according to any one of supplements 1B-6B, wherein the third random access resource set is associated with a downlink signal, the downlink signal being an SSB or an NR-U DRS.

8B. The apparatus according to any one of supplements 1B-6B, wherein the fifth random access resource includes at least two time-domain starting positions, the at least two time-domain starting positions including a first time-domain starting position and a second time-domain starting position, the first time-domain starting position being before the second time-domain starting position.

9B. The apparatus according to supplement 8B, wherein the apparatus further includes:
a first detecting unit configured to detect a channel before the first time-domain starting position and/or the second time-domain starting position;
and the transmitting unit transmits the first message starting from the first time-domain starting position or the second time-domain starting position according to a result of channel detection.

10B. The apparatus according to supplement 8B, wherein a length of a time-domain resource occupied by the first message to which the first time-domain starting position corresponds is greater than a length of a time-domain resource occupied by the first message to which the second time-domain starting position corresponds.

11B. The apparatus according to supplement 8B, wherein the transmitting unit transmits the first message by puncturing a part of the first message.

12B. The apparatus according to supplement 11B, wherein the transmitting unit punctures a part of sequences or symbols to which the first message corresponds.

13B. The apparatus according to supplement 9B, wherein the length of the time-domain resource occupied by the first message to which the first time-domain starting position corresponds is equal to the length of the time-domain resource occupied by the first message to which the second time-domain starting position corresponds.

14B. The apparatus according to any one of supplements 1B-6B, wherein the third random access resource set further includes a sixth random access resource, a time-domain starting position of the sixth random access resource being before a time-domain starting position of the fifth random access resource.

15B. The apparatus according to supplement 14B, wherein the apparatus further includes:
a second detecting unit configured to detect a channel before the time-domain starting position of the sixth random access resource and/or the time-domain starting position of the fifth random access resource.

16B. The apparatus according to supplement 14B, wherein the fifth random access resource and the sixth random access resource overlap in time domain.

17B. The apparatus according to supplement 14B, wherein a time-domain ending position of the sixth random access resource is before a time-domain starting position of the fifth random access resource.

18B. The apparatus according to supplement 16B, wherein a time-domain length of the fifth random access resource is different from a time-domain length of the sixth random access resource.

19B. The apparatus according to supplement 16B or 17B, wherein the time-domain ending position of the fifth random access resource is identical to the time-domain ending position of the sixth random access resource.

What is claimed is:

1. A random access configuration apparatus, configured in a network device, the apparatus comprising:
a first transmitter configured to transmit:
a random access channel configuration index for configuring a first random access resource set; and
information indicating a terminal equipment to perform channel access attempting for transmission of a first message of a random access procedure, wherein
the random access channel configuration index corresponds to a random access channel configuration in a random access channel configuration set, all random access resources included in the first random access resource set are located within the same uplink bandwidth part (UL BWP), the information indicating a terminal equipment to perform channel access attempting for transmission of a first message of random access procedure is included in at least one of System Information Block 1 (SIB1) and dedicated Radio Resource Control (RRC), signaling.

2. The apparatus according to claim 1, wherein the random access channel configuration set comprises at least one of the following parameters:
time gap between random access resources which are neighboring to each other in time domain;
invalid random access resource;
time-domain starting position of a random access resource in a slot;
candidate time-domain starting position of a random access resource;
time-domain ending position of a random access resource; and
number of channel access attempts.

3. The apparatus according to claim 1, wherein at least one random access channel configuration in the random access channel configuration set is not used for a licensed frequency band; or at least one random access channel configuration in the random access channel configuration set is not used for an unlicensed frequency band.

4. The apparatus according to claim 1, wherein the first random access resource set comprises a first random access resource and a second random access resource, the first random access resource and the second random access resource overlapping in time domain, and a time-domain starting position of the second random access resource being before a time-domain starting position of the first random access resource.

5. The apparatus according to claim 1, wherein the apparatus further comprises:
a second transmitter configured to transmit second indication information to the terminal equipment, the second indication information indicating at least one of the following information:
a second random access resource set;
at least two time-domain starting positions of a random access resource;
time-domain ending position of a random access resource;
number of channel access attempts; and
type of channel access.

6. The apparatus according to claim 5, wherein the second random access resource set comprises a third random access resource and a fourth random access resource, the third random access resource and the fourth random access resource overlapping in time domain.

7. A signal transmission apparatus, configured in a terminal equipment, the apparatus comprising:
a first receiver configured to receive:
a random access channel configuration index for configuring a first random access resource set; and
information indicating the terminal equipment to perform channel access attempting for transmission of a first message of a random access procedure;
processor circuitry configured to determine a random access resource set which is a subset of the first random access resource set; and
a transmitter configured to transmit the first message on a random access resource according to a result of channel detection which is performed according to the information before a time-domain starting position of a random access resource in the determined random access resource set, the determined random access resource set comprising the random access resource on which the first message is transmitted.

8. The apparatus according to claim 7, wherein the apparatus further comprises:
the processor circuitry determines the first random access resource set according to the random access channel configuration index.

9. The apparatus according to claim 8, wherein,
the processor circuitry determines the first random access resource set according to the random access channel configuration index and a predefined or pre-configured rule.

10. The apparatus according to claim 9, wherein the rule is any one of the following:
only the first one of random access resource(s) in a slot is valid;
only an odd numbered random access resource in a slot is valid; and
only an even numbered random access resource in a slot is valid.

11. The apparatus according to claim 7, wherein the apparatus further comprises:

a second receiver configured to receive second indication information, the second indication information indicating a random access resource set.

12. The apparatus according to claim 11, wherein the determined random access resource set is the indicated random access resource set.

13. The apparatus according to claim 7, wherein the random access resource on which the first message is transmitted comprises at least two time-domain starting positions, the at least two time-domain starting positions comprising a first time-domain starting position and a second time-domain starting position, the first time-domain starting position being before the second time-domain starting position.

14. The apparatus according to claim 7, wherein the transmitter transmits the first message by puncturing a part of the first message.

15. The apparatus according to claim 14, wherein the transmitter punctures a part of sequences or symbols to which the first message corresponds.

16. The apparatus according to claim 7, wherein the determined random access resource set further comprises another random access resource, a time-domain starting position of the another random access resource being before a time-domain starting position of the random access resource on which the first message is transmitted.

\* \* \* \* \*